United States Patent
Bisdikian et al.

[19]

[11] Patent Number: 5,974,406
[45] Date of Patent: Oct. 26, 1999

[54] AUTOMATED MATCHING, SCHEDULING, AND NOTIFICATION SYSTEM

[75] Inventors: Chatschik Bisdikian, Mt. Kisco; Yurdaer Nezihi Doganata, Chestnut Ridge; Asser Nasreldin Tantawi, Somers, all of N.Y.

[73] Assignee: International Business Machines Corporation, Armonk, N.Y.

[21] Appl. No.: 08/914,302

[22] Filed: Aug. 18, 1997

[51] Int. Cl.⁶ .................................................. G06F 17/30
[52] U.S. Cl. ........................................ 707/1; 707/3; 707/5
[58] Field of Search .................... 707/1, 3, 4, 5; 705/8; 364/479.01

[56] References Cited

U.S. PATENT DOCUMENTS

| | | | |
|---|---|---|---|
| 4,984,155 | 1/1991 | Geier et al. | 705/26 |
| 4,992,940 | 2/1991 | Dworkin | 705/26 |
| 5,164,897 | 11/1992 | Clark et al. | 705/1 |
| 5,592,375 | 1/1997 | Salmon et al. | 705/5 |
| 5,594,791 | 1/1997 | Szalm et al. | 379/265 |
| 5,675,788 | 10/1997 | Husick et al. | 707/104 |
| 5,740,231 | 4/1998 | Cohn et al. | 379/88.22 |
| 5,758,328 | 5/1998 | Giovannoli | 705/26 |
| 5,808,894 | 9/1998 | Wiens et al. | 364/479.01 |
| 5,825,943 | 10/1998 | DeVito et al | 382/306 |
| 5,835,896 | 11/1998 | Fisher et al. | 705/37 |
| 5,848,413 | 12/1998 | Wolff | 707/10 |
| 5,884,272 | 3/1999 | Walker et al. | 705/1 |
| 5,890,139 | 3/1999 | Suzuki et al. | 705/27 |

*Primary Examiner*—Paul R. Lintz
*Assistant Examiner*—Ella Colbert
*Attorney, Agent, or Firm*—Douglas W. Cameron; Ronald L. Drumheller

[57] ABSTRACT

A method and apparatus for providing customized notification in response to a search query. Moreover, with this invention, a query is received from a user via a user interface. The user also selected a time and means of notification, such as for example, by fax at a specified time. The system will also receive several notification choices from both the user and a supplier of information and match the choices so that a supplier can notify a user in accordance with a mutually selected time and means of notification.

12 Claims, 5 Drawing Sheets

AUTOMATED MATCHING, SCHEDULING, AND NOTIFICATION SYSTEM

TECHNICAL FIELD

This invention relates to a method and apparatus for providing customized notification in response to search queries.

DESCRIPTION OF THE PRIOR ART

With the ever increasing reach and use of the World Wide Web (WWW), the multimedia portion of the global network of interconnected computers called the Internet, the desire to exploit it commercially and contact business over it also increases. When it comes to electronic commerce, the great benefit from the global reach of the WEB is that it could bring together geographically dispersed buyers and sellers (or providers and receivers) of goods and services via easy to-use computer graphical interfaces.

A multitude of businesses may offer their goods for trading on the WEB, e.g., automobiles, audio/video equipment, clothes, real estate, mail order catalog services, etc. Also, on the WEB, one can provide services like theater seat and restaurant table reservations legal advice, insurance rate comparisons, etc. The use of such a publicly available and easy to use means of interfacing with providers of goods and services, simplifies the "window-shopping" process for finding an appropriate provider. It is also quite productive since it eliminates the time consuming exercise of talking in person or over the phone with each one of the candidate providers.

As the number of goods and services providers on the WEB increases, a very desirable feature for buyers is to locate easily the most appropriate item, person, company, service provider, etc, that best provides a buyer with a desired product or service. By generalizing the concepts of buyers and sellers, the latter holds true for sellers as well. In this invention the terms "sellers" and "buyers" are to be construed in the broadest sense of the terms, where the former are entities that are in possession of desirable resources and the later are entities in search of such resources. For example, in the context of this invention, the owner of a used vehicle that wants to sell it, while actively searches on the WEB to find a buyer for his vehicle, or advertises it on the WEB, he himself may be considered as a buyer (not of the vehicle itself but) of the operation/ service: "find me used-vehicle buyers."

With the plethora of information available on the WEB, locating a desired resource, e.g., a seller of a vehicle of a specific color, make, and year, could become a daunting task. So automated-search systems, called match-making services, or search-engines, etc, have been proposed and developed that categorize relevant information on the WEB and automate and simplify the search of this information. For example, an automated-search system which permits a user of the system, e.g., a potential buyer, to locate and order goods and services provided by a plurality of sellers is disclosed in R. E. Dworkin U.S. Pat. No. 4,992,940. The user of such a system uses a terminal connected to a computer system that is attached to local or remote database (s) that contain information, indexed in many different ways, about a large number of different goods and/or services. The user, after logs onto the system, provides information about the goods or services he desires and the computer after consulting the information stored in the database(s) returns to the user a list of goods and/or providers that best satisfy his desires. Then, the user, if he wants, makes a selection and order the goods or services electronically.

This form of search though is rather static. New information is continuously added on the WEB and the said information databases are continuously updated with newly advertised/registered providers of goods and services. If the user does not find the desired item while he is logged on the system, he needs to retry at a future time in hope that the desired item has become available. It would be desirable not require the user to follow such a try-and-error procedure of logging onto the automated-search system repeatedly until information about the desired item(s) become available.

SUMMARY OF THE INVENTION

It is accordingly an object of this invention to provide an automated-search system with a continuous desired information search until a match is found, or a maximum waiting-time has reached. This search would not require the user to be continuously logged onto the automated-search system.

It is thus another object of this invention to have the automated-search system communicate the results of the search by means of a customizable notification process, e.g., by telephone, fax, e-mail, etc. This notification could occur either at regular times, and/or upon finding a match, and/or after a maximum search time-horizon has elapsed.

It is yet another object of this invention to further enhance the automated-search system with the capability, after match (es) are found, to arrange meetings between interested parties according to prespecified meeting information, e.g., given a set of possible dates and times of meetings, independently provided by the buyers and sellers, the system can automatically arrange the meeting at a time that best fits the schedules of all interested parties.

Briefly, according to one embodiment of the invention, an automated-search system which is capable of receiving search profiles from users of the system if provided. The users communicate with the system via appropriate terminal devices, e.g., personal computers. The automated-search system uses said search profiles to match the characteristics of desired goods and/or services against information available to the automated-search system, e.g., via a database service attached to the system. These search profiles remain active at the system for a specified period of time, allowing searches to be performed for long periods of time as more and more information is added in the database. The automated-search system will also receive from the user and maintain a user notification profile. In the notification profile, the user will specify preferred means of notification. Following a search the system will notify the user of the results of the search using the user's preferred method(s). If it is so desired the system may even arrange for conference meetings between interested parties at convenient times.

BRIEF DESCRIPTION OF THE DRAWINGS

Referring to FIG. 4, FIG. 5 describes the steps taken by the Scheduling System 51 to find possible dates and times of contact between buyer and seller pairs.

DESCRIPTION OF THE PREFERRED EMBODIMENT

Figure 1:
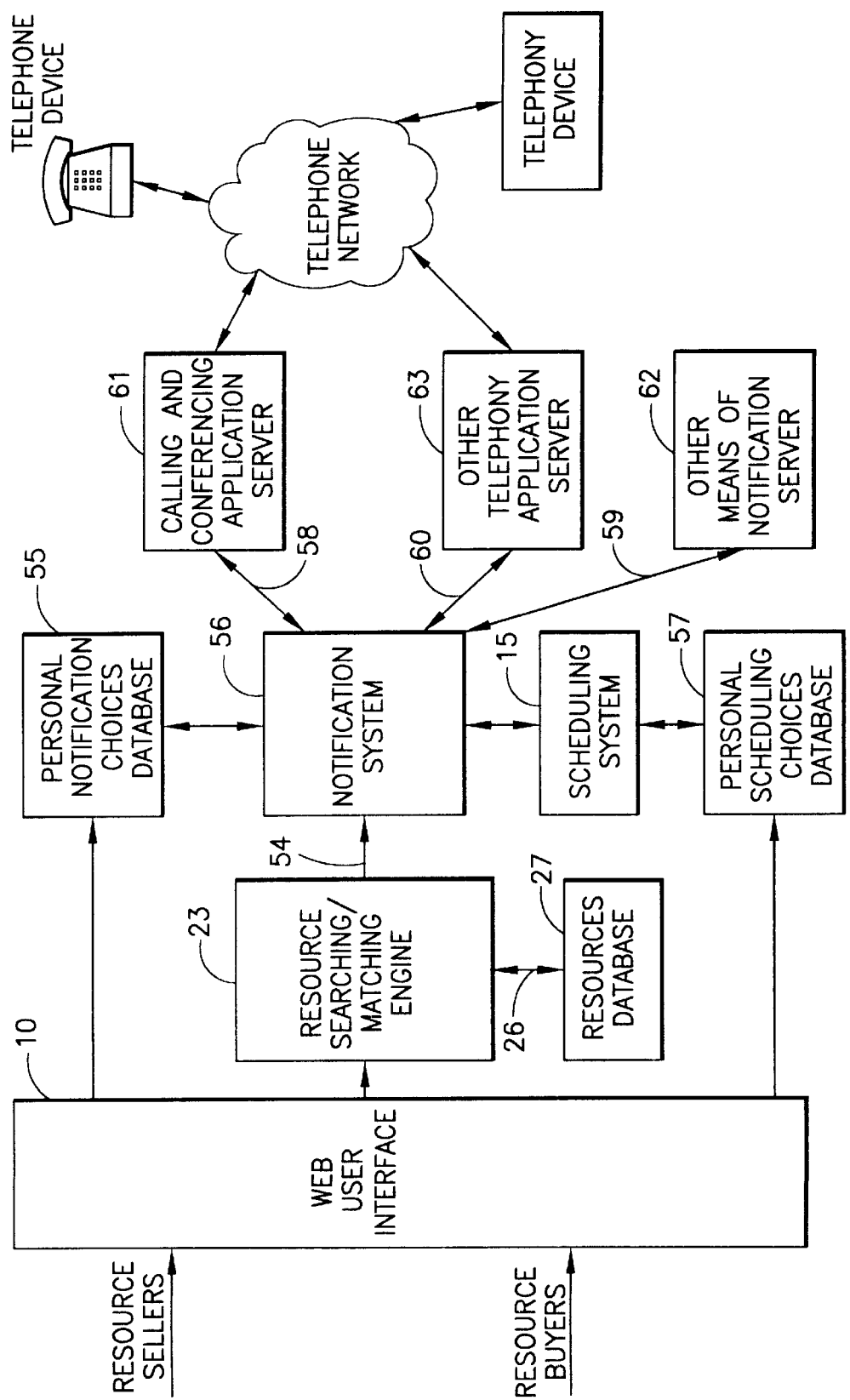
FIG. 1 schematically illustrates the matching and scheduling system in accordance with this invention.

FIG. 1 shows the components of the automated matching and the scheduling system. These components include a graphical user interface 10, a resource searching/matching engine 23, a Resources database 27, a Personal Notification choice database 55, and Scheduling database 57, a Scheduling system 15, a Notification System 15 and various Notification means 61–63, such as telephone, fax, and e-mail.

There are two types of users of this system: (1) Providers or sellers and (2) receivers or buyers. The users of this system input information regarding their offerings or their demands electronically. The information is placed in the resource database 27 and made available for the search engine 23. The users specify their choices via the graphical user interface 10, such as a WEB page, by clicking options or entering simple descriptions. The information that is provided by users includes the description of the entity being requested or offered, personal scheduling choices and personal notification choices. Personal scheduling choices of a user specify when the user wants to be notified, and personal notification choices specify how the user wants to be notified when a match is found. As an example, a buyer who is looking for a used car to buy may want to be notified only after 6:00 pm by a telephone message, or a provider/seller who is renting his/her apartment may want to be notified only during the weekends by fax or paging when a match is found for a tenant. A user of this system may enter information via a WEB browser, and the information is transmitted to a WEB server. Once the server receives and processes the information, the information is places into the resources database 24.

After a match is found between a buyer and a seller, the notification system is activated. The notification system is connected to various notification means which comprise various servers, such as audio conferencing, telephony application, paging, e-mail servers, etc. The notification system connects to one of these servers based on the choice of notification. If the users want to be notified by telephony, the notification process connects to the telephony server. If the result of the matching process requires a conference call between the matched parties and the third parties, then the notification process is connected to the conference server, etc. The servers used for notification have the interface to the physical layer of all communications media.

Preferred Embodiment

With the automated matching service, the user accesses the service through a computer terminal, e.g., a personal computer, that is connected to the service through a communications link, e.g., a modem and a telephone line. The service interfaces with the user through a browsing suite of application software. In our preferred embodiment, this suite of application software comprises the widely available WEB. Using a standard keyboard and a mouse pointer, the user can access and navigate through the matching service's WEB pages.

The objective of the matching service is to find a match between what the user of the service is looking for and what is known on related items to the service. For this reason, the user of the service provides search profiles against which the matching process takes place.

Figure 2:
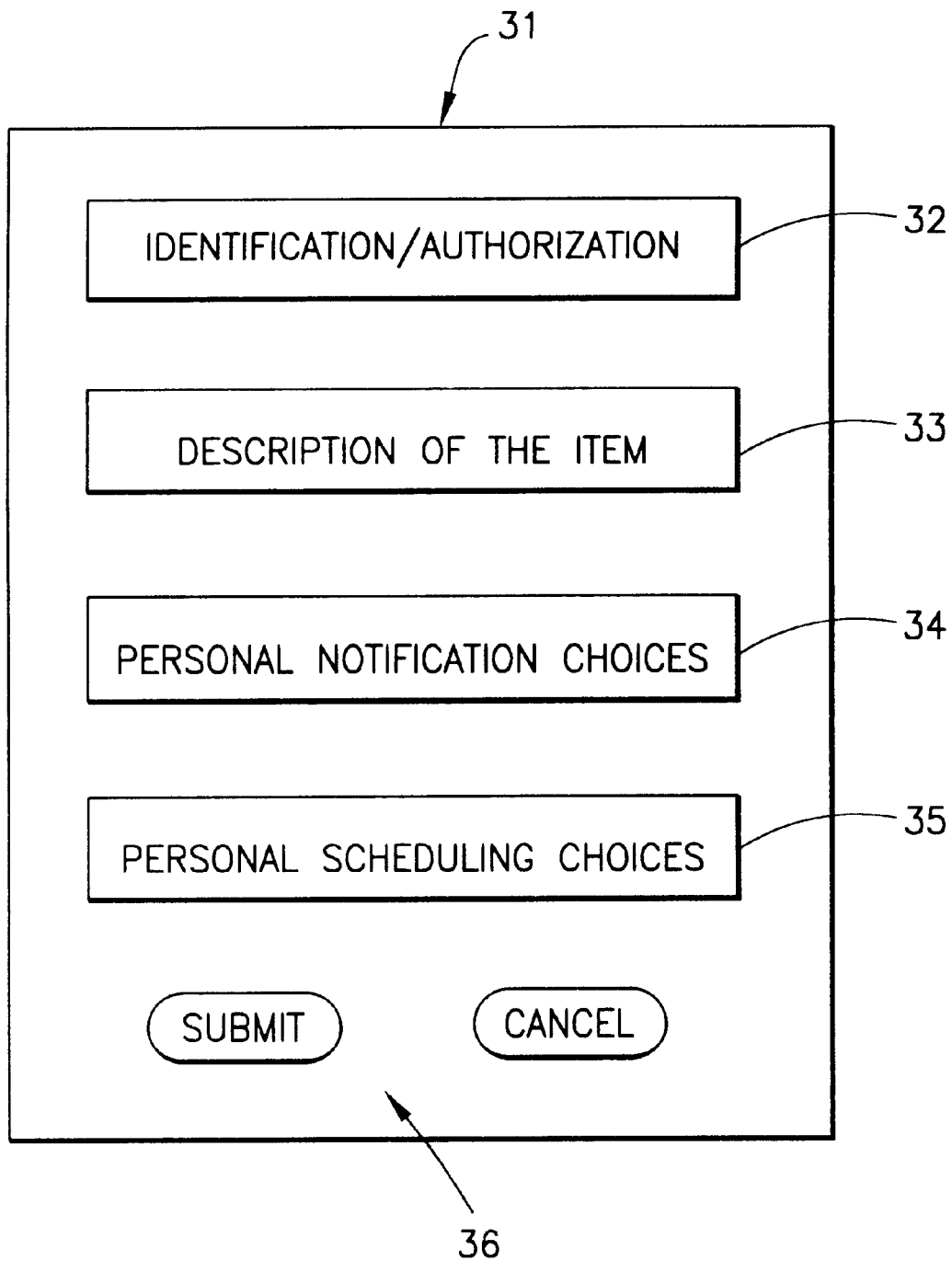
FIG. 2 graphically illustrates the WEB page or graphic user interface for entering notification choices.

FIG. 2. depicts an example of the contents of a WEB page 31 of the automated matching service. This WEB page 31 contains information fields 32–35, which could also be links to other WEB pages that request more detailed information.

The information with which the user will fill these information fields would be used to form the search profile that the matching service will use for its search. These information fields include, but not limited to, personal identification/authorization information 32. The user provides all necessary information about him/herself to register or identify him/herself to the service. This information could be the user's name, possibly a password, a telephone number, a mailing address, credit card information for payments, etc. The next piece of information 33 relates to the item that is to be searched for. This information will identify the item, e.g., a car, and its attributes, e.g., make, model, year(s), color, accessories, etc. The user could also be requested to provide a time horizon over which the search for the specific item should be carried on, e.g., for a week, a month, etc.

Next, the user specifies the Personal Notification Choices in the appropriate information field 34. The personal notification choices pertain to the means with which the matching service is to notify the user whenever a match is found. This aspect of the matching service is very desirable especially when an immediate match cannot be found, and the user has to disconnect from the matching service facility. Potential means of notification include, but not limited to, e-mail notification, telephone, fax, beeper, etc. The user may rank these notification choices according to his/her preference and have the service attempt to contact the user based on this ranking. If the user cannot be reached with a first choice, then the matching service tries to reach him/her with the next choice. A default choice may also be provided where the user is notified of a match after (s)he reconnects to the service. Yet, another information field that the user may fill is the Personal Scheduling Choices 35. In this field, the user provides the identities of third parties that should also be contacted when a match is found. In addition, the user can provide information to schedule a meeting with all interested parties based on calendar schedules that each of the parties has provided to the system. For example, a real estate agent, at the request of house-buyers, may place search requests to locate houses for sale with specific attributes, e.g., size, location, etc. When a match (or matches) is found, the service may arrange for an appropriate time at which the house-buyers, and the real-estate agent will inspect the house. The service will notify the house-buyer, the real-estate agent, and the house-seller of the time of on-site inspection.

Figure 3:
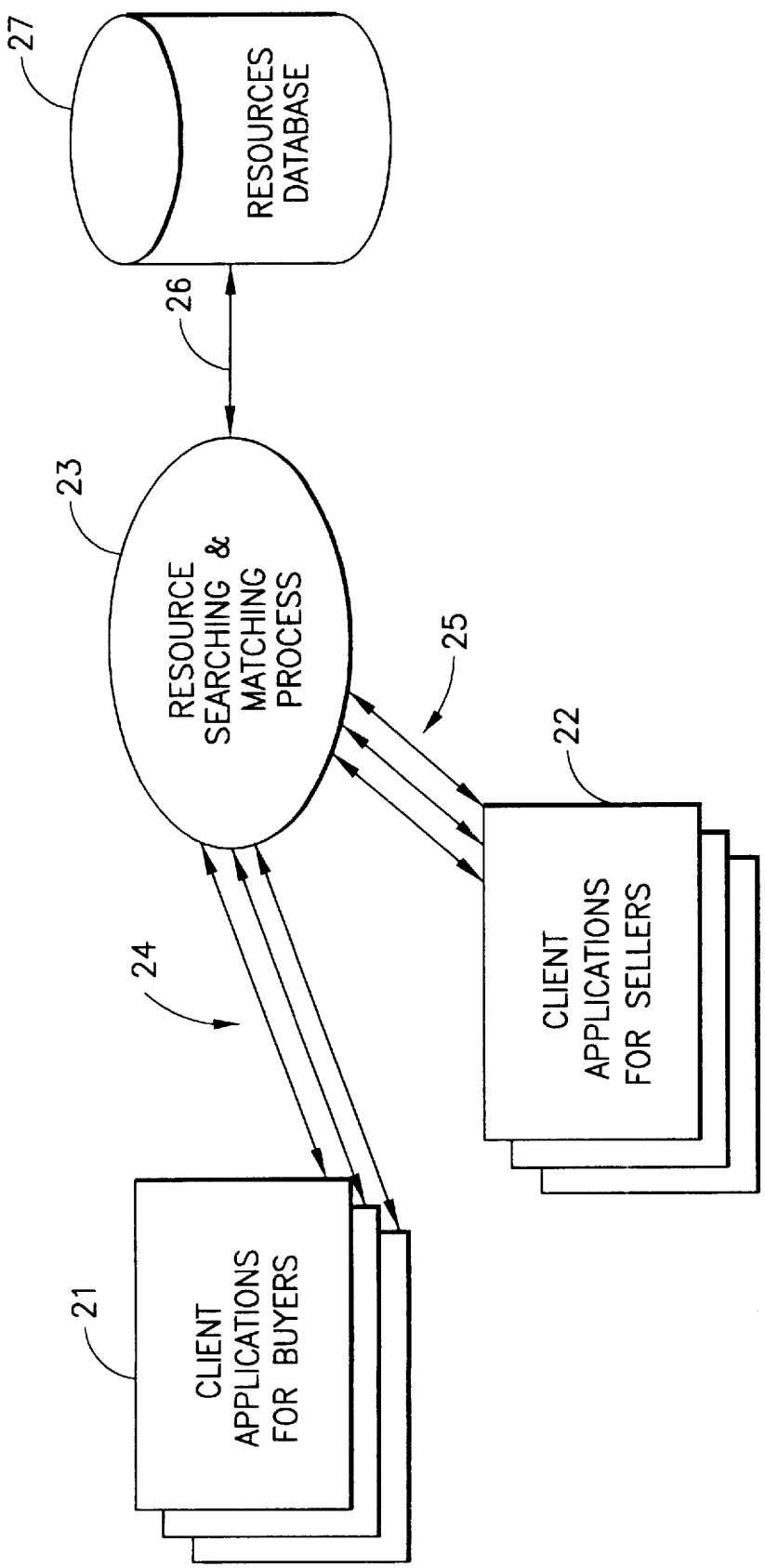
FIG. 3 graphically illustrates how client applications for sellers and buyers are related to the search and matching process of this invention.

FIG. 3 shows how the client applications for sellers 22 and the client applications for buyers 21 are connected to the search and matching process 23. The resource searching and matching engine 23 accepts the service requests 24 or 25 from the clients 21–22 and searches the resources database 27 for a possible match. The information regarding the sellers offerings and the buyers demands are stored in the resources database 27. After a match is found, the resource searching and matching process sends a message 28 to the notification system (See 15 of FIG. 1) to take further actions. Usually the client applications are not in the same locations with the matching process, hence the communication is accomplished over a data network. Each client application establishes an individual connection 24–25 between the client machine, and the machine that runs the matching server process 23. The connection to the resource sharing and the matching process is established as soon as the client requests a service. This service request is communicated to the resource searching and matching process 23 over this established data connection. There is a two-way data flow 50 between the matching process and the resources database. The buyers and sellers profiles are written/stored or read/retrieved from the resources database 27 over the data connection 26.

FIG. 1 also depicts how a request coming from a client is processed. The Resource Matching and Searching Server Process 23 accepts the request for a match and searches the Resources Database 27. Every time a new request comes, the search is repeated to make sure that a possible match is not missed.

Figure 4:
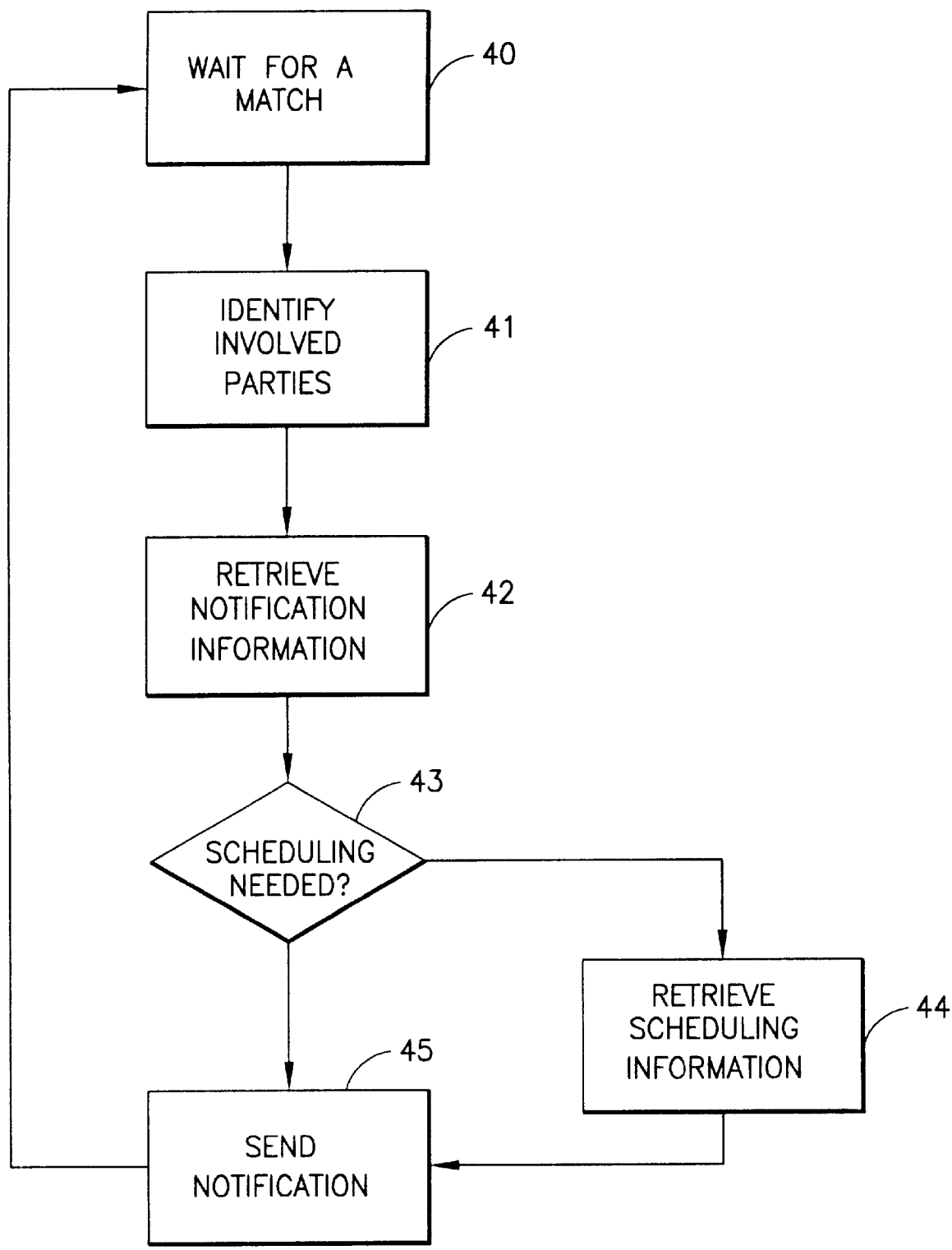
FIG. 4 describes the steps taken by the Notification System 56 after it receives the signal 54 from the resource searching and matching engine 24.

Resource Searching and Matching Server 23 generates a request for notification (to be processed by the Notification System 56) only if a match is found among the requesters. This request is sent to the Notification System via signal 54. The signal contains information identifying the specific match and the corresponding pair(s) of buyer and seller(s). FIG. 4 describes the steps taken by the Notification System 56 after it receives the signal 54 from the resource searching and matching engine 24. Referring to FIG. 4, the Notification System waits for a match signal to be sent 40. As soon as the Notification System receives the request via signal 54, it starts processing the request by first identifying the involved parties 41, including both sellers and buyers, related to this request. The Notification System then consults the Personal Notification Choices Database 55 and retrieves 42 the Personal Notification Choices information that the submitter of this particular request (the buyer) had entered in the Personal Notification Choices entry 34 of the submission Web page 31 in FIG. 2. Similarly, it retrieves the Personal Notification Choices of the sellers. The Notification System also requests the services of the Scheduling System 15 (See FIG. 1) to obtain contact dates and times (44) between buyers and sellers if such contacts are desired by the involved parties. The operation of the Scheduling System 51 is described in FIG. 5 and explained in the next paragraph. After the Notification System 56 collects all the needed notification and scheduling information for a specific match, it sends a notification 45 to the involved parties by requesting the services of an appropriate media dependent server 61, 62, 63, to be discussed further later, by generating a notification signal 58, 59, 60 respectively.

Figure 5:
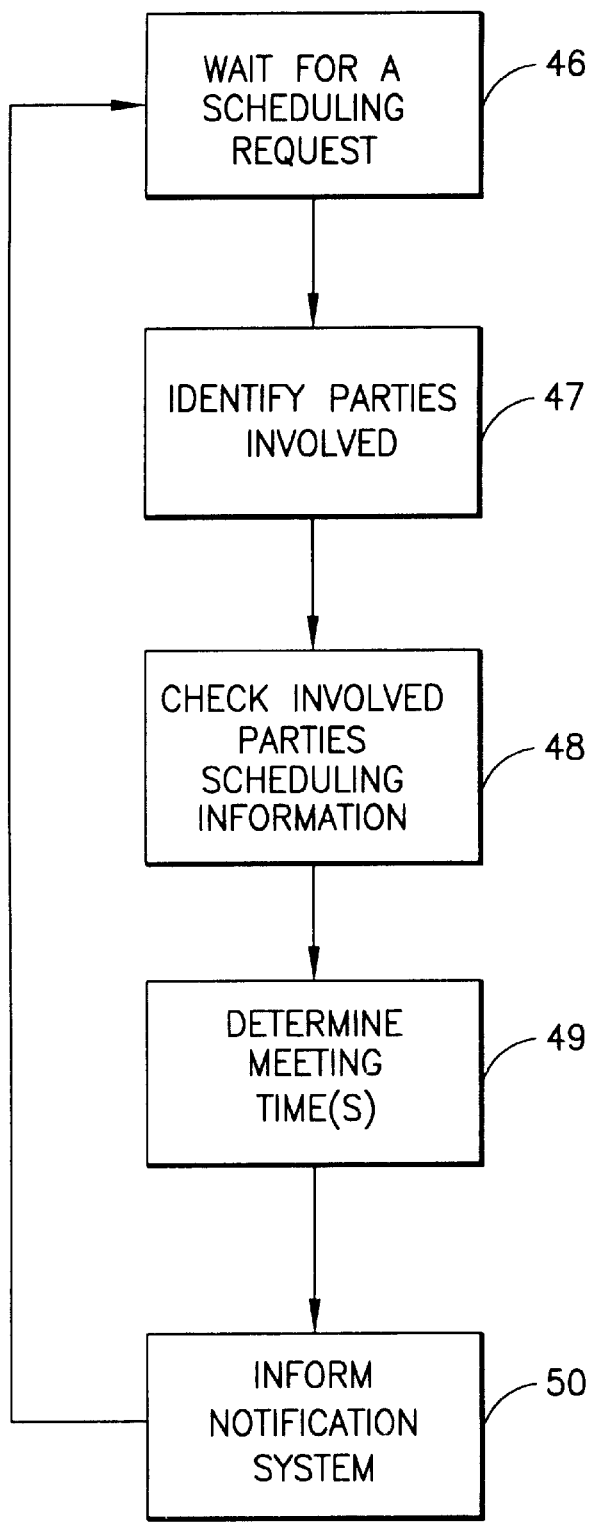

FIG. 5 describes the steps taken by the Scheduling System 51 to find possible dates and times of contact between buyer and seller pairs. Originally, the scheduling system waits 46 for a scheduling request to be sent from the Notification System 51. After a scheduling request arrives, the Scheduling System identifies the parties involved in the current scheduling request 47 and it retrieves their personal scheduling choices 48, e.g., their calendar schedules, stored in the Personal Scheduling Choices Database 57. This information had been entered by users of the system in the Personal Scheduling Choices entry 35 of the submission Web page 31 in FIG. 2. The Scheduling System 51 then then determines the most appropriate time(s) for the involved parties to contact each other 49. The Scheduling System 51 then reports the contact dates and times 50 to the Notification System 56 and readies itself for processing a subsequent scheduling request.

With all the necessary information now available Notification System 56, the Notification System can notify the buyer, and the potential seller(s), of the outcome of the match and the possible contact dates and times using the personal notification choices that buyers and seller have specified. For example, if the parties want to be contacted by telephone the Notification System 56 requests the services of a audio-conferencing server 61 by sending a signal 58 to it. Similarly, if the parties want to be contacted at a particular time and date by a pager, a fax, an e-mail, a voice-mail, etc., the Notification System will request, at an appropriate time, the services of the corresponding server.

A media specific notification server can be easily implemented either through manual means, e.g., having an operator explicitly typing an e-mail note, or requesting from a third party to establish a teleconference between the involved parties, e.g., using Sprint's Internet Conference Center, or send a fax to the involved parties, e.g., using Hitachi's faxWEB service, etc. Or, one may automate this process by interfacing the Notification System with a fax server, or a pager system, etc. Such automated systems are all available currently in the open market either as stand-alone boxes, or as hardware and software add-ons in computer system, e.g., Dialogic's CTI (Computer Telephony Integration) audio-conferencing personal computer cards, Omtool's workstation-based fax server solutions, Lotus Development Corporation's pager gateway, etc.

Having thus described our invention, what we claim as new and desire to secure by Letters Patent is:

1. A method of providing requested information, response to a search query made to an automated-search system by a logged-on user desiring said requested information, said requested information being determined by said automated-search system and provided to the user after the user has logged-off of the automated-search system, said method comprising:

receiving and storing a personalized user notification profile at the automated-search system from the user desiring said requested information, said user notification profile including a user preferred notification choice selected from a set of different possible notification choices that includes at least one notification choice other than electronic mail;

receiving a search query at the automated-search system from said user during a logged-on session;

matching said query with information in a database, where the information is associated with a potential provider of said requested information and said matching is completed only after said user has logged-off of said system; and after said user has logged-off of the automated-search system, notifying said user with said requested information in accordance with said stored user notification profile.

2. A method as recited in claim 1, wherein said user notification profile comprises a means and time of notification.

3. A method as recited in claim 1, wherein said means of notification is a telephone message.

4. A method as recited in claim 1, wherein said means of notification is a fax message.

5. A method as recited in claim 1, wherein said means of notification is an electronic mail message.

6. An automatic matching and scheduling system for providing information to a user after the user has logged-off of the system, comprising:

a. a user interface for receiving a search query and a personalized user notification profile from the user, the user notification profile including a user preferred notification choice selected from a set of different possible notification choices that includes at least one notification choice other than electronic mail;

b. a search engine for searching a database for information in response to said search query even after the user has logged-off of the system; and c. a notification system for delivering said information to the user when the user is no longer logged-on to the system, the user being notified of said information in accordance with said user notification profile.

7. A method as recited in claim 6, wherein said user notification profile comprises a means and time of notification.

8. A method as recited in claim 6, wherein said means of notification is a telephone message.

9. A method as recited in claim 6, wherein said means of notification is a fax message.

10. A method as recited in claim 6, wherein said means of notification is an electronic mail message.

11. A method as recited in claim 6, wherein said user interface comprises a plurality of information fields on a WEB page display, wherein said information fields are used to receive said search query and said user notification profile.

12. An automated matching and scheduling system for providing goods or services in response to a search query, said system comprising:

a. a user interface for receiving said query from a potential buyer of said goods or services and for receiving information from providers of said goods or services, said user interface also receiving personalized user notification profiles from said buyer and said providers of said goods or services, said user notification profiles including a user preferred notification choice selected from a set of different possible notification choices that includes at least one notification choice other than electronic mail;

b. a storage medium for storing information about said goods or services and said providers;

c. a search engine for searching for information in response to said search query wherein said information includes information on those of said goods or services and those of said providers requested in said search query and wherein said searching for information continues even after said buyer has logged-off of the system; and d. a notification system for delivering said information to said buyer, wherein said buyer is notified of said information after said buyer has logged-off of said system in accordance with said user notification profile for said buyer.

\* \* \* \* \*